United States Patent [19]
Chen

[11] Patent Number: 5,765,794
[45] Date of Patent: Jun. 16, 1998

[54] ANGLE ADJUSTING DEVICE FOR AN INSTRUMENT PANEL

[76] Inventor: Ping Chen, No. 29, Nanmei St., Nantun Li, Nantun Dist., Taichung, Taiwan

[21] Appl. No.: 711,892

[22] Filed: Sep. 12, 1996

[51] Int. Cl.⁶ ............................................. G12B 9/00
[52] U.S. Cl. .................. 248/292.12; 248/292.13; 248/923; 248/27.1
[58] Field of Search .............. 248/292.12, 292.13, 248/288.4, 223.41, 27.1, 27.3, 922, 923, 921, 919

[56] References Cited

U.S. PATENT DOCUMENTS

| | | | |
|---|---|---|---|
| 1,890,577 | 12/1932 | Flake | 248/292.13 |
| 3,845,928 | 11/1974 | Barrett et al. | 248/292.13 |
| 4,790,504 | 12/1988 | Wills et al. | 248/923 V |
| 4,881,707 | 11/1989 | Garfinkle | 245/292.12 X |
| 5,108,062 | 4/1992 | Detwiler | 248/923 Y |
| 5,271,590 | 12/1993 | Rosen | 297/217.3 X |
| 5,320,311 | 6/1994 | Jensen et al. | 248/27.1 |
| 5,584,726 | 12/1996 | Le Gallic et al. | 248/27.1 X |

Primary Examiner—Peter M. Cuomo
Assistant Examiner—Rodney B. White
Attorney, Agent, or Firm—Jones, Day, Reavis & Pogue

[57] ABSTRACT

An angle adjusting device includes an adjusting plate fixedly mounted on a bottom wall of an instrument panel and having an extension extending from an underside thereof, and a supporting socket pivotally engaged with the extension.

11 Claims, 8 Drawing Sheets

5,765,794

ANGLE ADJUSTING DEVICE FOR AN INSTRUMENT PANEL

FIELD OF THE INVENTION

The present invention relates to an angle adjusting device, and more particularly to an angle adjusting device for an instrument panel of an exercise machine.

BACKGROUND OF THE INVENTION

A conventional instrument panel of an exercise machine is shown in FIG. 8, and there will be a complete illustration in the detailed description of the preferred embodiments, concerning the conventional instrument panel.

The present invention has arisen to mitigate and/or obviate disadvantages of the conventional instrument panel.

SUMMARY OF THE INVENTION

In accordance with one aspect of the present invention, there is provided an angle adjusting device including an adjusting plate which is fixedly mounted on a bottom wall of an instrument panel and has an extension extending from an underside thereof, and a supporting socket pivotally engaged with the extension.

Further features of the present invention will become apparent from a careful reading of the detailed description with appropriate reference to the accompanying drawings.

DETAILED DESCRIPTION OF THE PREFERRED EMBODIMENTS

Figure 8:
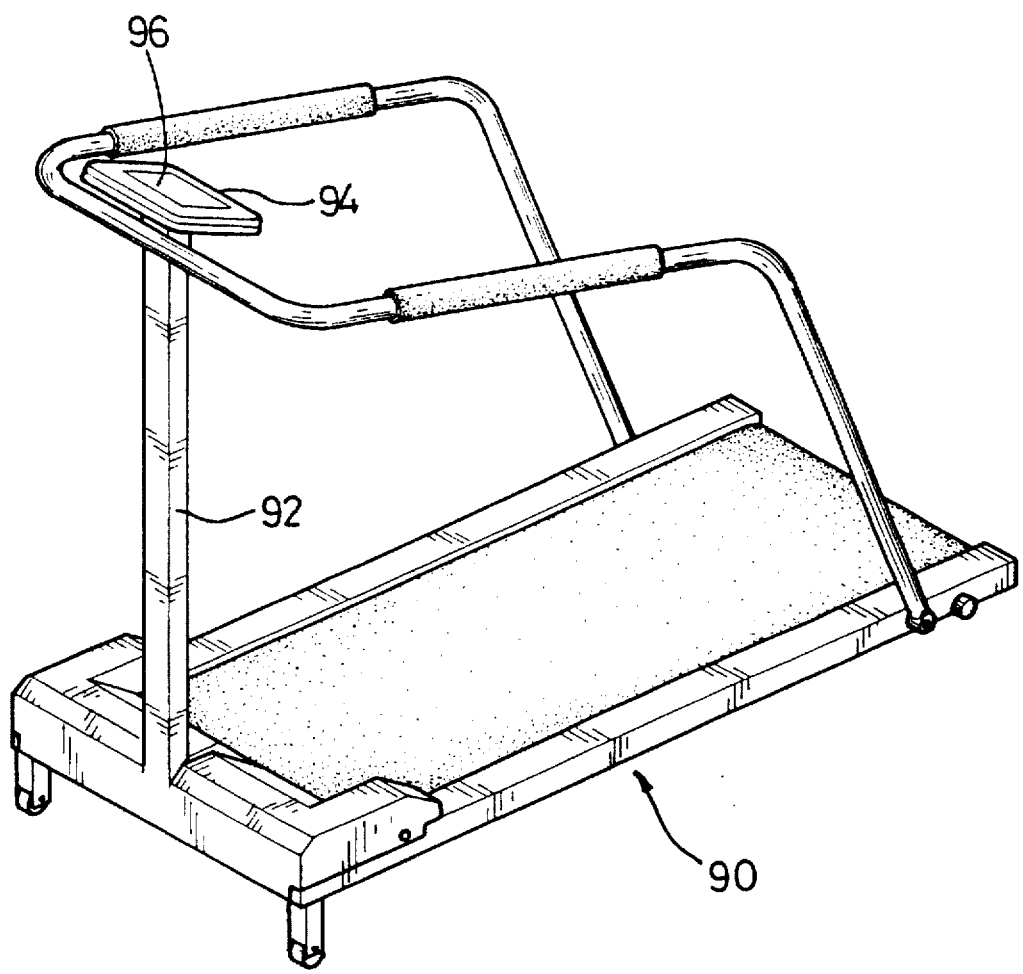
FIG. 8 is a perspective view of a conventional instrument panel in accordance with the prior art which is fitted to an exercise machine.

For a better understanding of the present invention, reference is made to FIG. 8, illustrating a conventional instrument panel 94 in accordance with the prior art.

The instrument panel 94 is fixedly mounted on an upright post 92 of an exercise machine such as a running practicing machine 90 and has a display monitor 96 mounted thereon.

By such an arrangement, however, the instrument panel 94 is fixedly fitted on the upright post 92 in an inclined manner without a possibility of adjusting an inclined angle thereof such that such an instrument panel 94 cannot suit users of different stature, thereby greatly limiting the versatility thereof.

Figure 1:
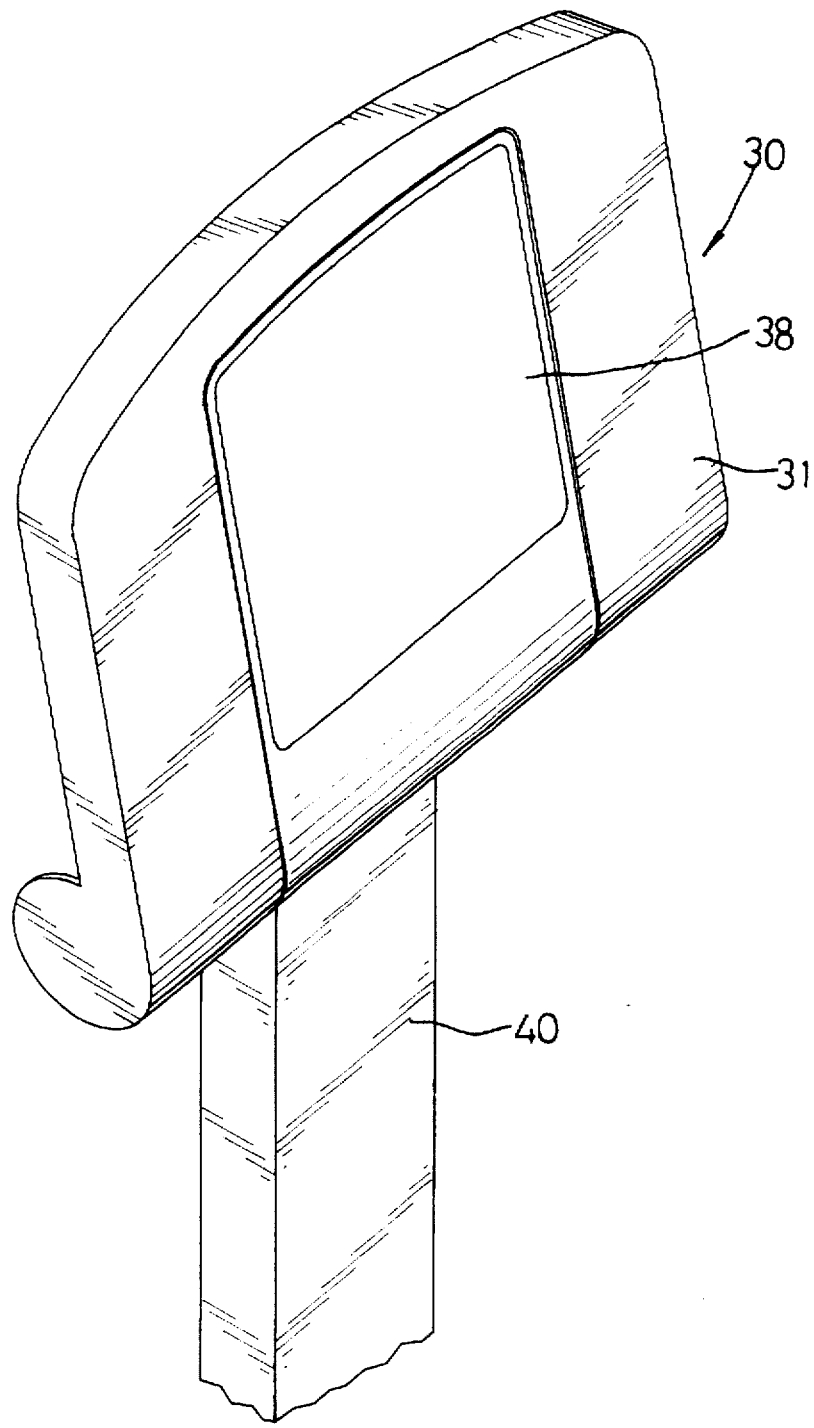
FIG. 1 is a perspective view of an instrument panel in accordance with the present invention.
Figure 2:
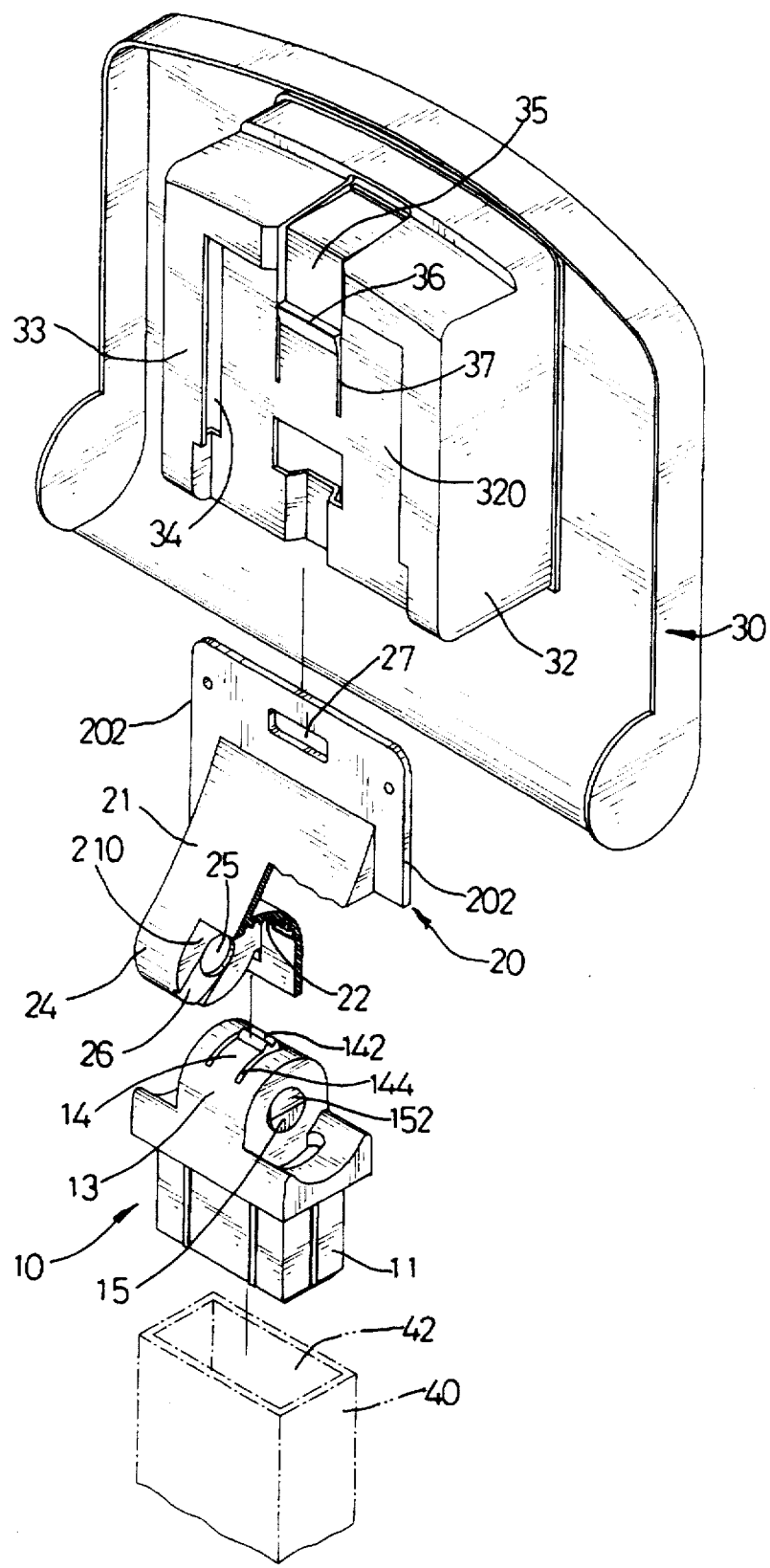
FIG. 2 is an exploded view of an adjusting device according to a-first embodiment of the present invention.
Figure 3:
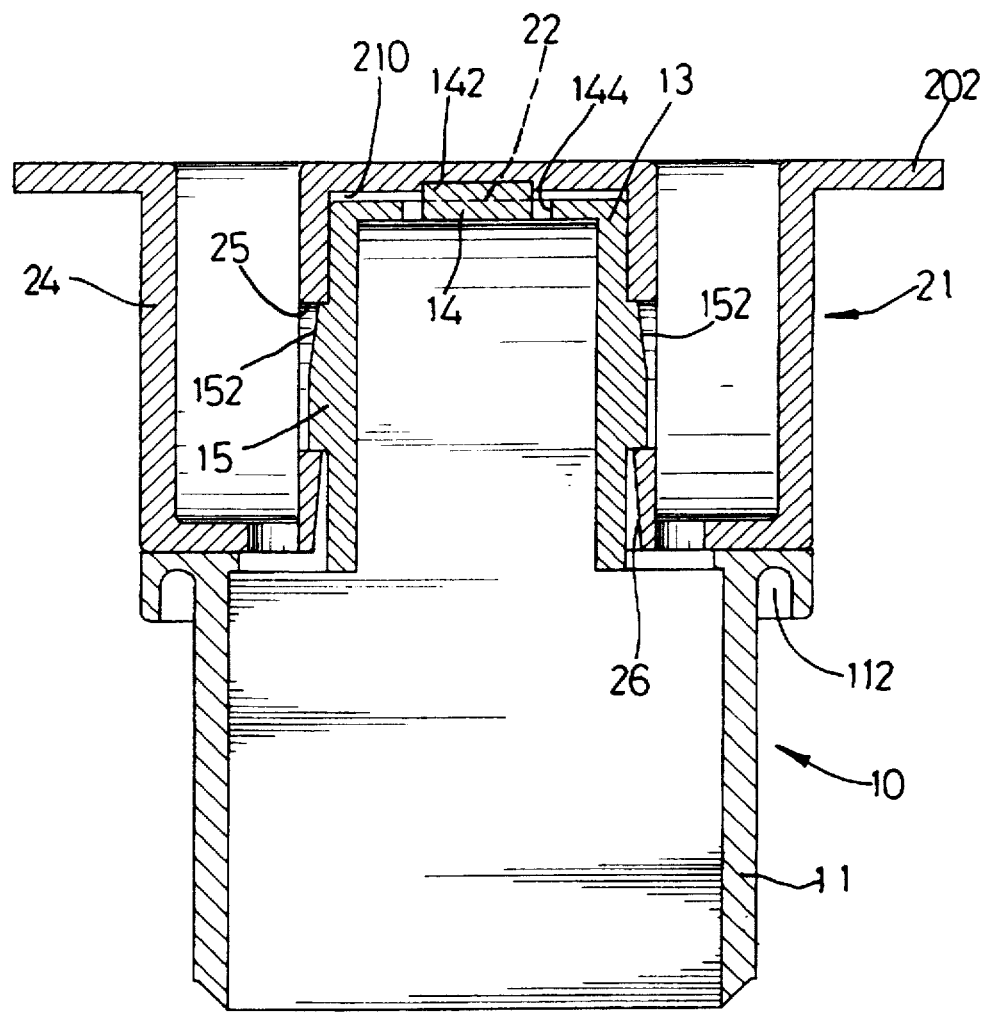
FIGS. 3 and 4 are front plan cross-sectional assembly views of FIG. 2.

Referring to the remaining drawings, and initially to FIGS. 1-3, an angle adjusting device in accordance with a first embodiment of the present invention is provided for adjusting an inclined angle of an instrument panel 30 which is mounted on an exercise machine (not shown) such as a running practicing machine, a rocking machine and the like and includes a top wall 31 having a display monitor 38 mounted thereon and a bottom wall 32.

The angle adjusting device comprises an adjusting plate 20 fixedly mounted on the bottom wall 32 of the instrument panel 30 and having an extension 21 extending outwardly from an underside thereof, and a supporting socket 10 pivotally engaged with the extension 21.

The bottom wall 32 of the instrument panel 30 includes a receiving surface 320 having two edges each having an L-shaped flange 33 formed thereon. Each of the two flanges 33 has an elongate guiding groove 34 defined therein.

A substantially U-shaped slit 37 is defined in the receiving surface 320 by which a snapping strip 35 is formed. A hook 36 protrudes from the snapping strip 35 and is located in the U-shaped slit 37.

The adjusting plate 20 is slidably mounted on the receiving surface 320 and has two side edges 202 each received in a respective one of the two guiding grooves 34 and stopped by an associated flange 33. An aperture 27 is defined in the adjusting plate 20 for detachably receiving the hook 36 therein such that the adjusting plate 20 can be secured on the bottom wall 32 of the instrument panel 30.

The supporting socket 10 includes a lower plug portion 11 fitted in a passage 42 defined in an upright post 40 and having an annular groove 112 defined therein for receiving a top portion of the upright post 40 therein such that the supporting socket 10 can be securely mounted on the upright post 40.

The extension 21 includes two ears 24 each protruding therefrom. A recess 210 is defined in the extension 21 and is located between the two ears 24. A plurality of first teeth 22 are each serially arranged on the extension 21 and are each disposed in the recess 210.

The supporting socket 10 includes a lug 13 pivotally received in the recess 210 and having a substantially U-shaped slit 144 defined therein by which a resilient strip 14 is formed. A plurality of second teeth 142 are each serially arranged on the resilient strip 14 and each mesh with each of the plurality of first teeth 22.

Each of the two ears 24 has a first cavity 25 defined therein. The lug 13 includes two sides each having a block 15 protruding outwardly and received in a respective one of the two first cavities 25 such that the adjusting plate 20 can be pivoted on the supporting socket 20.

Each of the two ears 24 has a guiding channel 26 defined therein and communicating with an associated first cavity 25. Each of the two blocks 15 has a tapered guiding surface 152 formed thereon for facilitating each of the blocks 15 to be received into each of the first cavities 25 via a guidance of an associated guiding channel 26.

Figure 4:
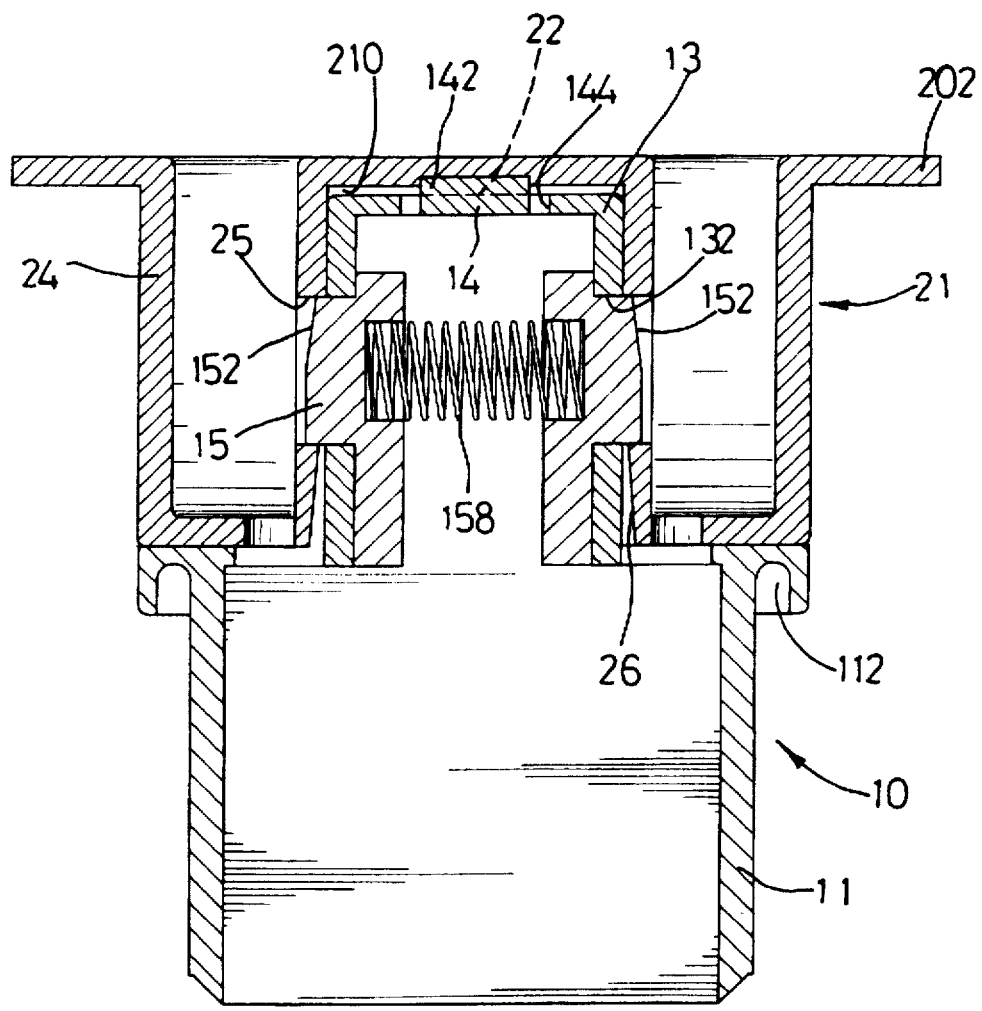

Alternatively, referring to FIG. 4 with reference to FIG. 2, each of the two sides of the lug 13 has a second cavity 132 defined therein. Each of the two blocks 15 is movably mounted in the lug 13, extending through each of the two second cavities 132 and received in an associated first cavity 25. A biasing member 158 is mounted between the two blocks 15.

Figure 5:
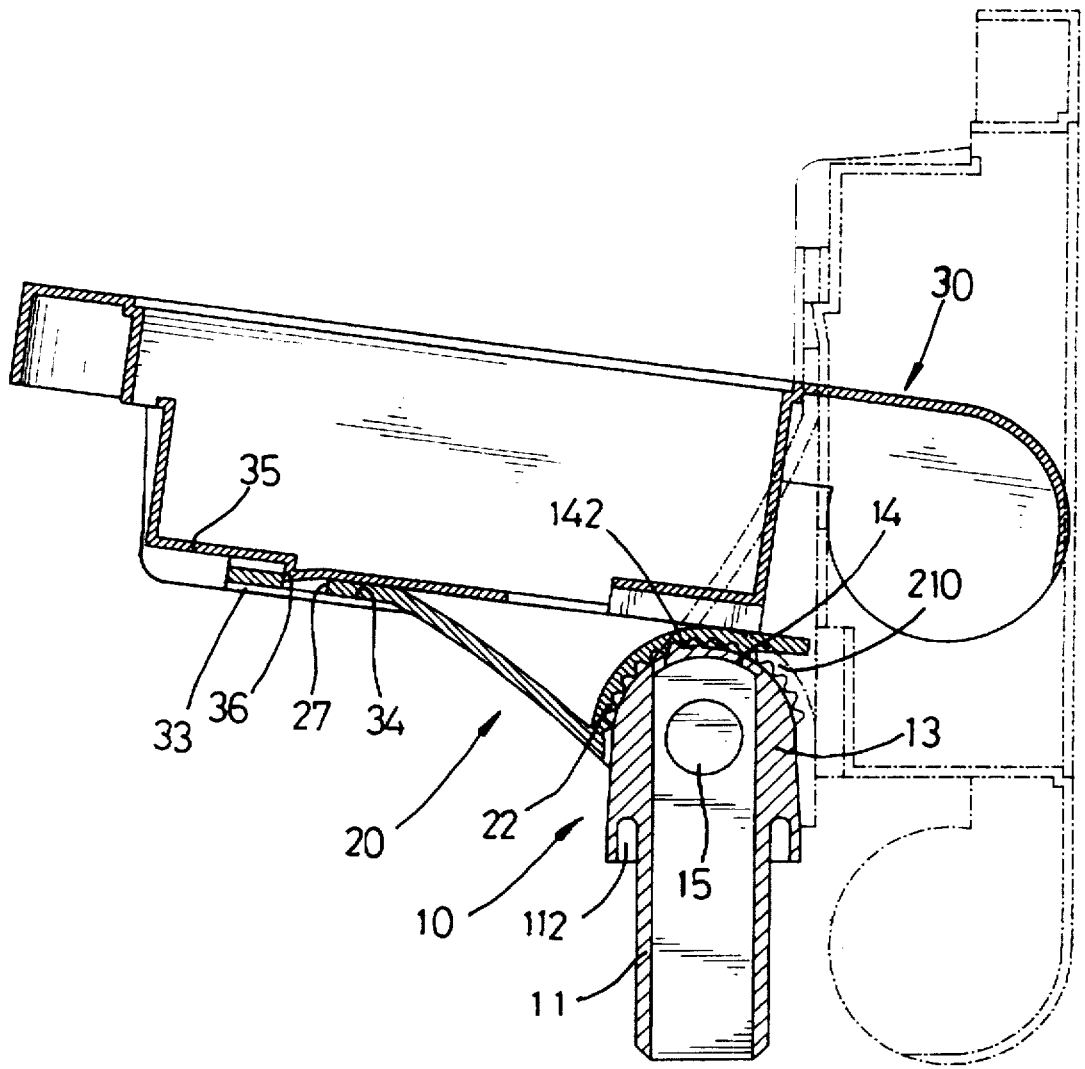
FIG. 5 is a side cross-sectional operational assembly views of FIG. 2.

In operation, referring to FIGS. 2 and 5, the adjusting plate 20 together with the instrument panel 30 can be pivoted on the supporting socket 10 by means of a pivotal engagement between each of the two ears 24 and the lug 13 such that the inclined angle of the instrument panel 30 relative to the upright post 40 can be arbitrarily adjusted.

The plurality of second teeth 142 detachably meshing with the plurality of first teeth 22 can be used to provide an intermediary and intermittent positioning effect for retaining the adjusting plate 20 on the supporting socket 10 due to the resilience of the resilient strip 14.

Figure 6:
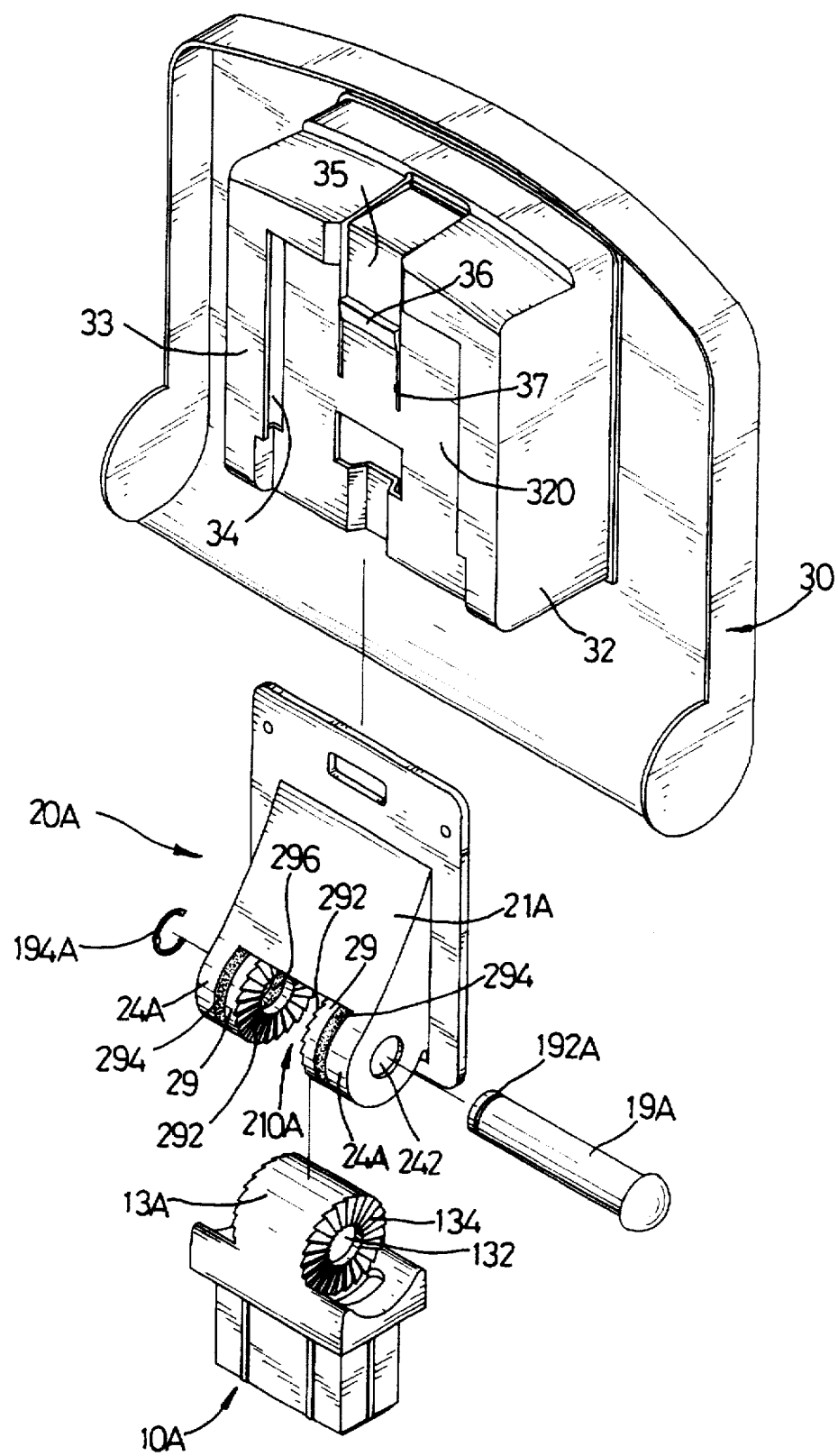
FIG. 6 is an exploded view of an adjusting device according to a second embodiment of the present invention.

Referring to FIG. 6, in accordance with a second embodiment of the present invention, an adjusting plate 20A includes an extension 21A having two ears 24A each protruding therefrom. A recess 210A is defined in the extension 21A and is located between the two ears 24A. Two catch rings 29 are each received in the recess 210A and each have a first side fixedly located beside each of the two ears 24A and a second side having a plurality of first teeth 292 radially arranged thereon.

A supporting socket 10A includes a lug 13A pivotally received in the recess 210A and having two sides each having a plurality of second teeth 134 radially arranged thereon and each meshing with each of the plurality of first teeth 292.

Preferably, two washers 294 are each mounted between a corresponding one of the two ears 24A and the first side of an associated catch ring 29.

Each of the two ears 24A has a first hole 242 defined therein, each of the two catch rings 29 has a second hole 296 defined therein, and the lug 13A has a third hole 132 defined therein. A pivot pin 19A in turn extends through each of the two first holes 242, each of the two second holes 296, and the third hole 132 such that the adjusting plate 20A can be pivoted on the supporting socket 10A.

Preferably, the pivot pin 19A has an annular groove 192A defined along a periphery of one distal end thereof, and a snapping ring 194A is securely mounted in the annular groove 192A.

Figure 7:
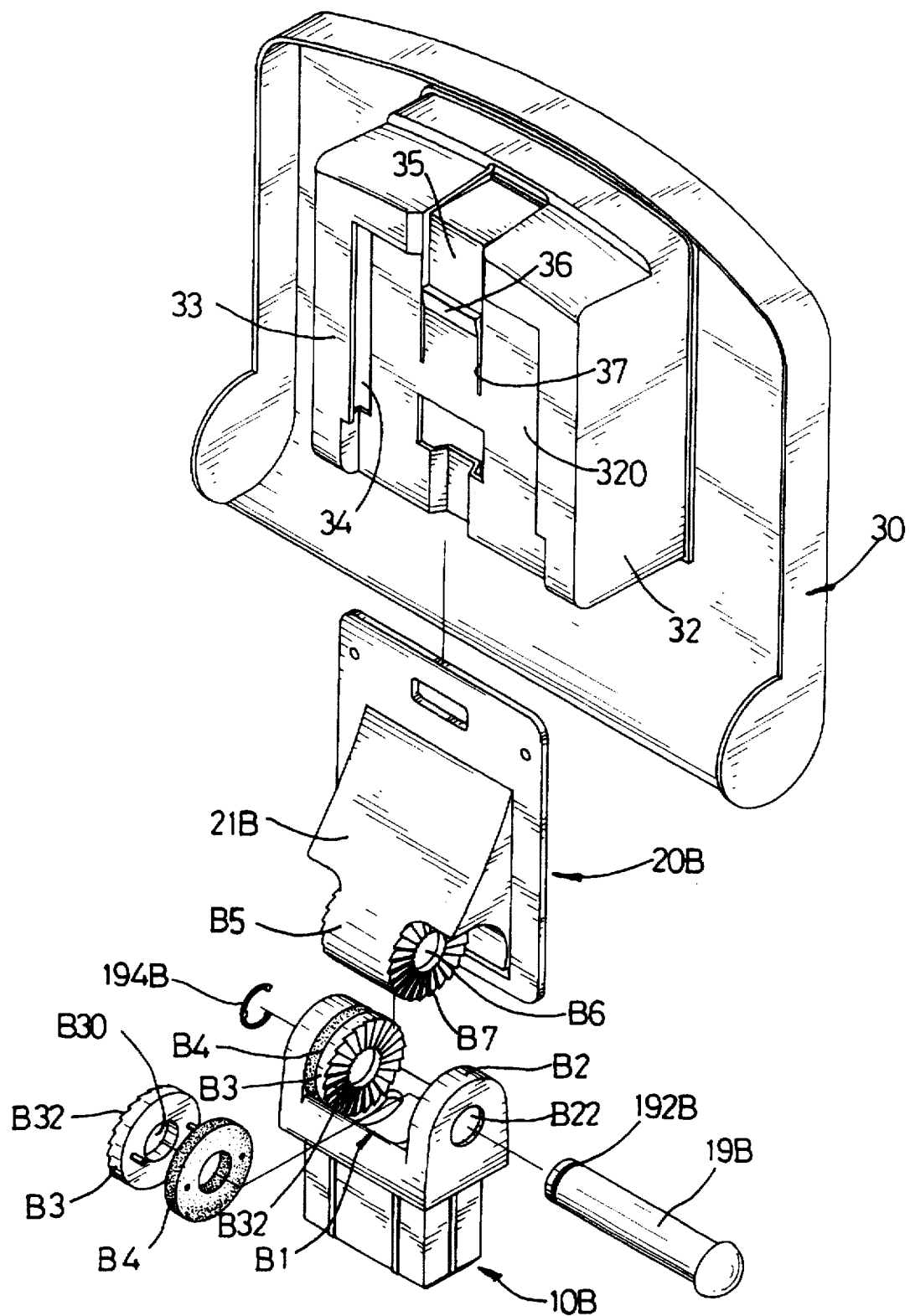
FIG. 7 is an exploded view of an adjusting device according to a third embodiment of the present invention.

Referring to FIG. 7, in accordance with a third embodiment of the present invention, a supporting socket 10B includes two ears B2 each protruding upwardly. A recess B1 is defined in the supporting socket 10B and is located between the two ears B2. Two catch rings B3 are each received in the recess B1 and each have a first side fixedly located beside each of the two ears B2 and a second side having a plurality of first teeth B32 radially arranged thereon.

An adjusting plate 20B includes an extension 21B including a lug B5 pivotally received in the recess B1 and having two sides each having a plurality of second teeth B7 radially arranged thereon and each meshing with each of the plurality of first teeth B32.

Preferably, two washers B4 are each mounted between a corresponding one of the two ears B2 and the first side of an associated catch ring B3.

Each of the two ears B2 has a first hole B22 defined therein, each of the two catch rings B3 has a second hole B30 defined therein, and the lug B5 has a third hole B6 defined therein. A pivot pin 19B in turn extends through each of the two first holes B22, each of the two second holes B30, and the third hole B6 such that the adjusting plate 20B can be pivoted on the supporting socket 10B.

Preferably, the pivot pin 19B has an annular groove 192B defined along a periphery of one distal end thereof, and a snapping ring 194B is securely mounted in the annular groove 192B.

It should be clear to those skilled in the art that further embodiments of the present invention may be made without departing from the scope and spirit of the present invention.

What is claimed is:

1. An angle adjusting device for an instrument panel, said instrument panel having a bottom wall, and said angle adjusting device comprising:

an adjusting plate for fixedly mounting to the bottom wall of said instrument panel and having an extension extending from an underside thereof, said extension including two ears each protruding therefrom, a recess defined in said extension and located between paid two ears, a plurality of first teeth each serially arranged on said extension and each disposed in said recess; and a supporting socket pivotally engaged with said extensions said supporting socket including a lug pivotally received in said recess and having a substantially U-shaped slit defined therein by which a resilient strip is formed, a plurality of second teeth serially arranged on said resilient strip and meshing with said plurality of first teeth.

2. The angle adjusting device in accordance with claim 1, wherein each of said two ears has defines a cavity defined therein and said lug has two sides each having a block protruding outwardly and received in each of said two cavities.

3. The angle adjusting device in accordance with claim 1, wherein each of said two ears defines a first cavity defined therein, said lug having two sides each defining a second cavity therein, two blocks each mounted in said lug, each extending through each of said two second cavities and each received in an associated said first cavity, and a biasing member mounted between said two blocks.

4. An angle adjusting device for an instrument panel, said instrument panel having a bottom wall, and said angle adjusting device comprising:

an adjusting plate for fixedly mounting to the bottom wall of said instrument panel and having an extension extending from an underside thereof, said extension including two ears each protruding therefrom, a recess defined in said extension and located between said two ears, two catch rings each received in said recess and each having a first side fixedly located beside each of said two ears and a second side having a plurality of first teeth radially arranged thereon; and a supporting socket pivotally engaged with said extension, said supporting socket including a lug pivotally received in said recess and having two sides each having a plurality of second teeth radially arranged thereon and meshing with said plurality of first teeth.

5. The angle adjusting device in accordance with claim 4, further comprising two washers each mounted between a corresponding one of said two ears and the first side of an associated said catch ring.

6. The angle adjusting device in accordance with claim 4, wherein each of said two ears defines a first hole therein, each of said two catch rings defining a second hole therein, said lug defining a third hole therein, and a pin in turn extending through each of said two first holes each of said two second holes and said third hole.

7. The angle adjusting device in accordance with claim 6, wherein said pin defines an annular groove defined along a periphery of one distal end thereof, and a snapping ring securely mounted in said annular groove.

8. An angle adjusting device for an instrument panel, said instrument panel having a bottom wall, and said angle adjusting device comprising:

an adjusting plate for fixedly mounting to the bottom wall of said instrument panel and having an extension extending from an underside thereof, said extension including a lug having two sides each having a plurality of first teeth radially arranged thereon; and a supporting socket pivotally engaged with said extension, said supporting socket including two ears each protruding upwardly therefrom, a recess defined in said supporting socket and located between said two ears for receiving said lug, two catch rings each received in said recess and each having a first side fixedly located beside each of said two ears and a second side having a plurality of second teeth radially arranged thereon and meshing with said plurality of first teeth.

9. The angle adjusting device in accordance with claim 8, further comprising two washers each mounted between a corresponding one of said two ears and the first side of an associated said catch ring.

10. The angle adjusting device in accordance with claim 8, wherein each of said two ears defines a first hole therein, each of said two catch rings defining a second hole therein, said lug defining a third hole therein, and a pin in turn extending through each of said two first holes, each of said two second holes, and said third hole.

11. The angle adjusting device in accordance with claim 10, wherein said pin defines an annular groove along a periphery of one distal end thereof, and a snapping ring securely mounted in said annular groove.

* * * * *